Sept. 8, 1931. K. FERGUSON-ROBERTS 1,822,457
HARMONY CALCULATOR
Filed July 15, 1930 2 Sheets-Sheet 1
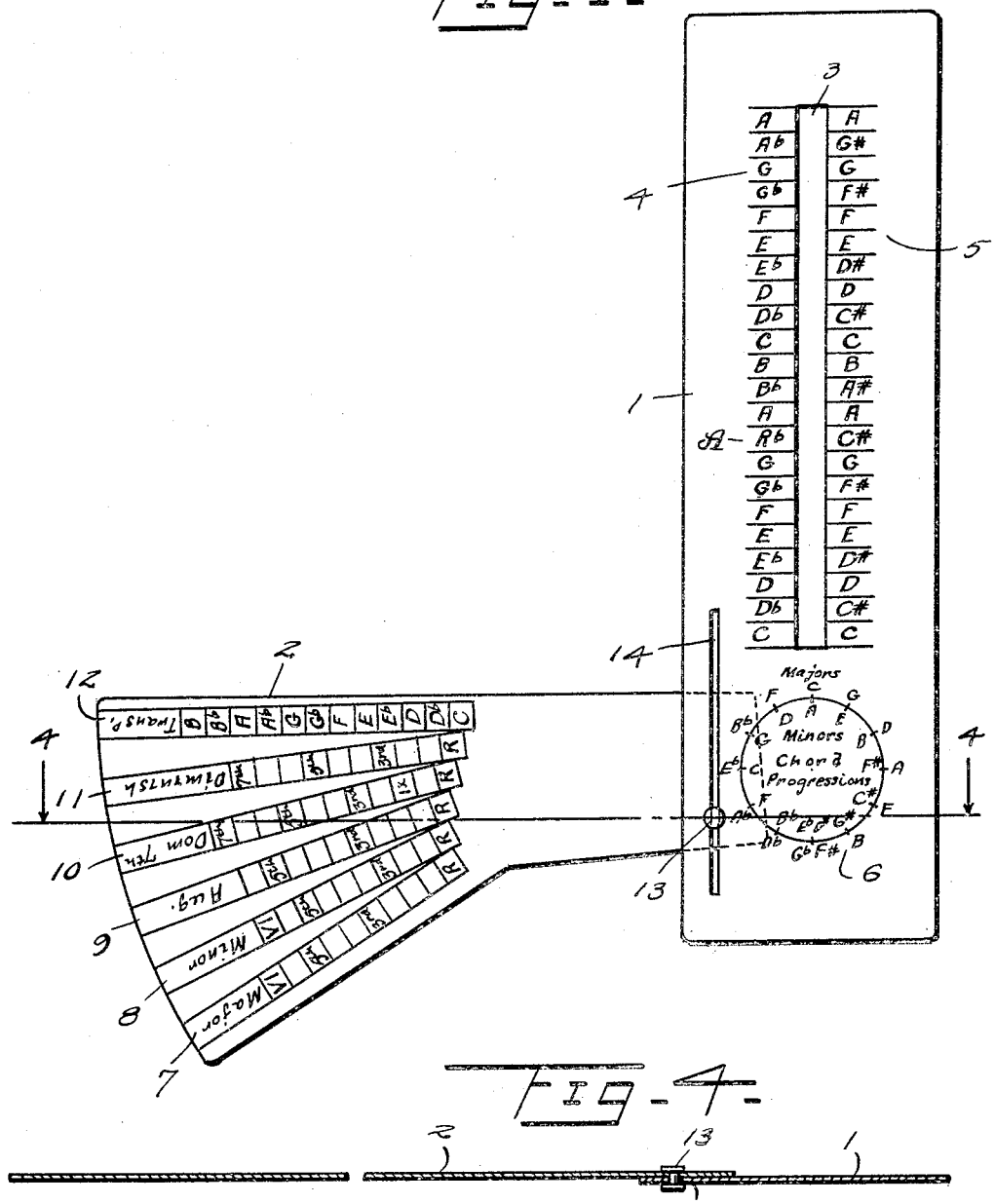

Sept. 8, 1931.  K. FERGUSON-ROBERTS  1,822,457
HARMONY CALCULATOR
Filed July 15, 1930   2 Sheets-Sheet 2
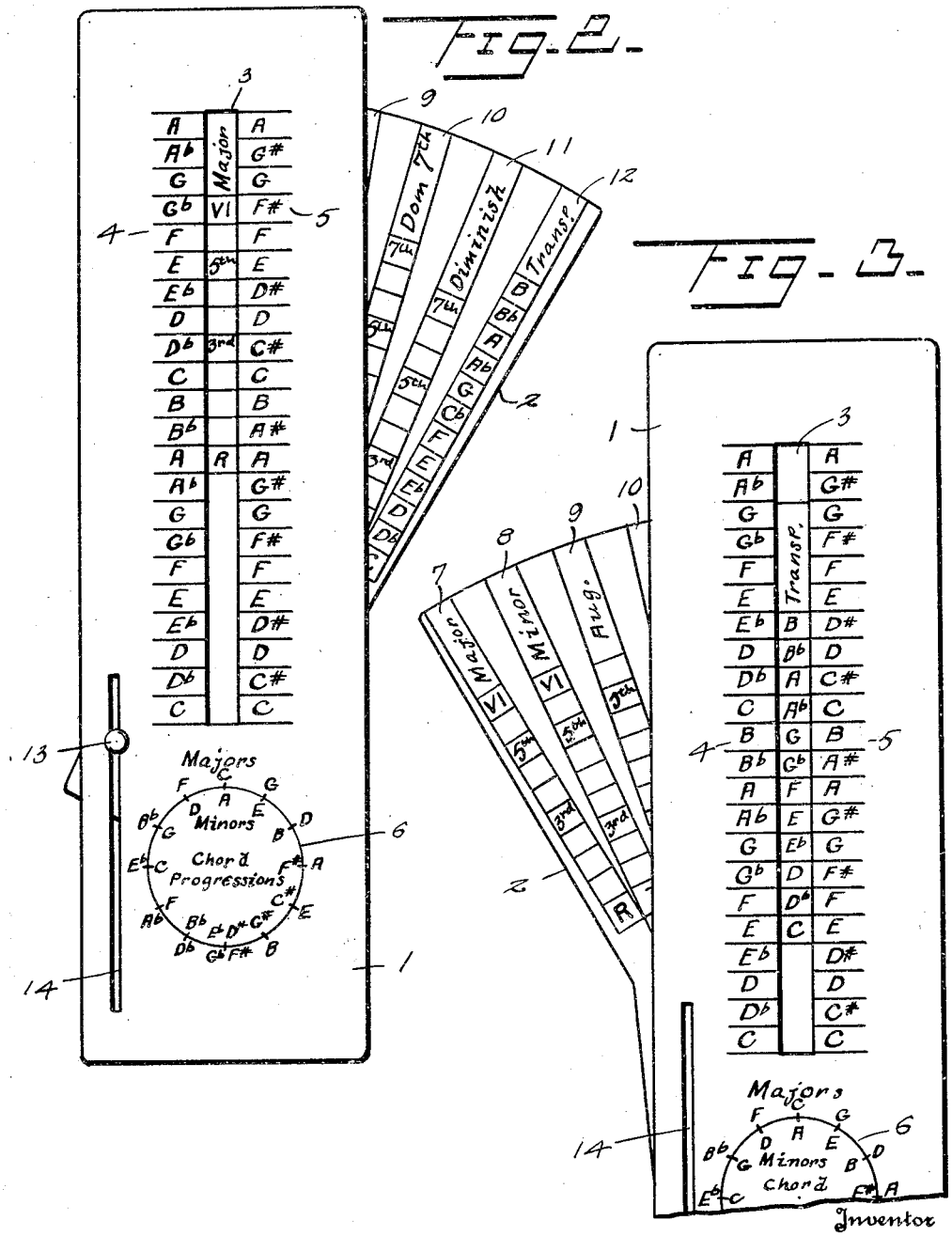
Inventor
K. Ferguson-Roberts
By Watson E. Coleman
Attorney Patented Sept. 8, 1931

1,822,457

UNITED STATES PATENT OFFICE

KENNETH FERGUSON-ROBERTS, OF OAKLAND, CALIFORNIA

HARMONY CALCULATOR

Application filed July 15, 1930. Serial No. 468,179.

This invention relates to a harmony calculator and has for one of its objects to provide a novel and simple device of this character through the medium of which a student of music may easily and quickly ascertain the notes contained in any major, minor, augmented or diminished chord, and through the medium of which the student may easily and quickly perform the most difficult transpositions.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in front elevation of the calculator with the front and rear members or plates thereof arranged in inoperative relation;

Figure 2 is a view in front elevation of the calculator with the members or plates thereof arranged to indicate the notes contained in a major chord;

Figure 3 is a view in front elevation of the calculator illustrating the manner in which the members thereof are arranged to effect the transposition of a piece of music, and Figure 4 is a sectional view taken on the plane indicated by the line 4—4 of Figure 1.

The harmony calculator comprises a front member or plate 1 which is of elongated rectangular formation in elevation, and a rear member or plate 2 which is of substantially sector formation in elevation. The plates 1 and 2 may be made of any light-weight and opaque material. The plate 1 has a slot 3 which extends vertically and centrally thereof, the slot terminating short of the ends of the plate. A chromatic scale 4 with semi-tones indicated in flats and a chromatic scale 5 with semi-tones indicated in sharps, are printed on the face of the plate 1 at opposite sides of and parallel to the slot 3. A chord progressions chart 6 is printed on the face of the plate 1 below the slot 3 and scales 4 and 5, the "majors" and the "minors" of the chart being arranged in concentrically related annular series.

Chord charts 7, 8, 9, 10 and 11, and a transposing chart 12, are printed on the face of the plate 2 and extend radially of the plate. The charts 7 to 11 are designated "Major", "Minor", "Aug", "Dom 7th", and "Diminish", and the chart 12 is designated "Transp.", and these names are located at the upper ends of the charts. The major and minor chord charts 7 and 8 each consists of the characters R, 3rd, 5th and 6th, the augmented chord chart 9 consists of the characters R, 3rd and 5th, the dominant chord chart 10 consists of the characters R, IX, 3rd, 5th and 7th, and the diminished chord chart 11 consists of the characters R, 3rd, 5th and 7th. The transposition chart 12 consists of a chromatic scale with the semi-tones indicated in flats. The characters of the respective charts 7–12 read upwardly in the order stated.

The plate 2 is pivotally and slidably connected to the plate 1, to the end that any one of the charts 7–12 may be arranged in alinement with the slot 3 of the plate 1. This connection between the plates is established through the medium of a headed pin 13 which is carried by the lower end of the plate 2 and is slidably arranged in a vertical slot 14 formed in the lower portion of the plate 1 parallel to the slot 3 of said plate.

The manner in which the harmony calculator is adapted to be used is as follows: When it is desired to ascertain the notes contained in any major chord, the plates 1 and 2 are so relatively adjusted as to position the major chart 7 in alinement with the slot 3 and the character R of this chart in alinement with the root note of the chord whose notes are to be ascertained. If, for example, it is desired to ascertain the notes of the A major chord, the character R of the major chart 7 is arranged opposite the note A of the scale 4, as shown in Figure 2. This will arrange the characters 3rd and 5th of this chart opposite the notes C♯ and E of the scale 5, as shown in this figure, and it will thus be apparent that the notes of the A major chord are A, C♯ and E. The notes contained in any minor or augmented chord are ascertained by adjusting the plates 1 and 2 so as to arrange one or the other of these charts in alinement with the slot 3 and the character R of the chart appearing before the slot opposite the dominant note of the chord of the scale 4, the other notes of the chord being indicated in the scale 5 by the characters 3rd and 5th of the chart.

To ascertain the notes in any dominant or diminished chord, the plates 1 and 2 are relatively adjusted to arrange one or the other of the charts 10 and 11 in alinement with the slot 3, and the character R of the chart is arranged opposite the dominant note of the chord. As for instance, if it is desired to ascertain the notes of the A dominant 7th chord, the plates 1 and 2 are adjusted to arrange the chart 10 in alinement with the slot 3 and the character R of this chart opposite the note A of the scale 4, such note being the root of the chord, the 3rd, 5th and 7th notes of the chord appearing in the scale 5 opposite the characters 3rd, 5th and 7th of this chart.

The manner in which the calculator is adapted to be used for the purpose of transposing a piece of music is as follows: If it is desired to transpose a piece of music, either the melody or chords from the key of F to the key of A, the plates 1 and 2 are relatively adjusted so as to position the chart 12 in alinement with the slot 3 and the note F of the chart opposite the note A of the scale 4, as shown in Figure 3. Opposite each note or chord of the F scale will be found the corresponding note or chord of the A scale, as for example, a G minor chord when transposed to the key of A becomes a D minor chord, an E melody note becomes a G♯, etc.

I claim:—

1. A harmony calculator, comprising a front plate having a slot, a chromatic scale with semi-tones indicated in flats and a chromatic scale with semi-tones indicated in sharps on the face of the plate on opposite sides of and parallel to the slot, a rear plate having a series of chord charts each consisting of a line of characters, and means for pivotally and slidably connecting the plates so that they may be arranged to position one of the charts opposite said slot and one of the characters of such chart opposite that character of said first scale corresponding to the root note of the chord.

2. A harmony calculator, comprising a front plate having a slot, a chromatic scale with semi-tones indicated in flats and a chromatic scale with semi-tones indicated in sharps on the face of the plate on opposite sides of and parallel to the slot, a rear plate having a series of chord charts each consisting of a line of characters, and means for pivotally and slidably connecting the plates so that they may be arranged to position one of the charts opposite said slot and one of the characters of such chart opposite that character of said first scale corresponding to the root note of the chord, said means comprising a pin carried by the rear plate and slidably engaged with the front plate.

3. A harmony calculator, comprising a front plate of elongated rectangular formation in plan and having a vertical slot in the center thereof, a chromatic scale with semi-tones indicated in flats and a chromatic scale with semi-tones indicated in sharps on the face of the plate on opposite sides of and parallel to said slot, a rear plate of substantially sector formation in plan and having a plurality of chord charts and a transposition chart on its face and extending radially thereof, the front plate being provided with a second vertical slot, and a pin carried by the rear plate and mounted in said second slot to connect the plates for pivotal and lengthwise adjustment so that any one of the charts may be arranged in alinement with said first slot and movable in the direction of the length of said first slot.

In testimony whereof I hereunto affix my signature.

KENNETH FERGUSON-ROBERTS.